Dec. 25, 1934.   T. L. ROBINSON   1,985,693
ROLLER BEARING
Filed April 27, 1934
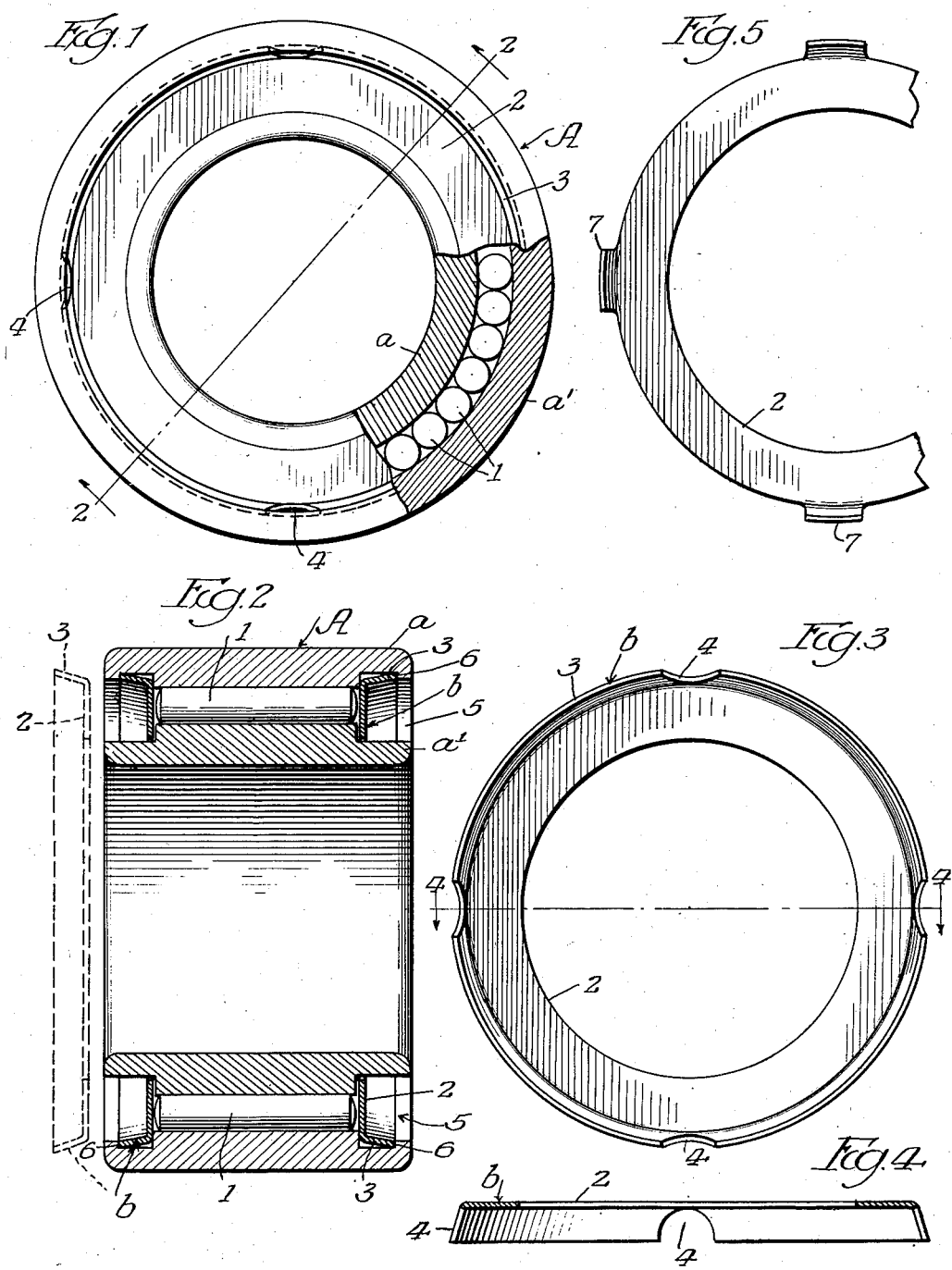
Inventor:
Thomas L. Robinson Patented Dec. 25, 1934

1,985,693

UNITED STATES PATENT OFFICE 1,985,693

ROLLER BEARING

Thomas L. Robinson, Valparaiso, Ind.

Application April 27, 1934, Serial No. 722,713

4 Claims. (Cl. 308—186)

This invention relates to anti-friction bearings of the general type comprising relatively rotatable inner and outer bearing members provided with concentric bearing surfaces, and anti-friction rollers mounted between the opposed bearing surfaces thereon, which form practically a continuous series extending entirely around the same and are free to contact with one another.

Objects of the invention are:—

To provide retaining means for confining the anti-friction rollers in operative position in the bearings;

To hold the inner bearing member against axial displacement both in operation, during assembly and in handling the assembled bearings;

To prevent access of dust and dirt to the bearings; and

To provide means for retaining lubricant in the bearings.

To effect the objects thereof, retaining means embodying my invention and improvements, consists of rings made of thin, resilient sheet material, preferably sheet steel, formed on which are outwardly dished marginal flanges, which are severed at intervals to form separate segments, to provide for free inward flexure thereof, to effect engagement of their flared edges with inwardly facing shoulders formed on the inner sides of extensions of the outer bearing member which project at both ends thereof beyond the ends of anti-friction rollers in operative position in the bearing.

The invention also comprises the various other features and details of construction hereinafter described and claimed.

In the accompanying drawing in which the invention is fully illustrated,

Figure 1 is an end view partly in section, of a roller bearing embodying my invention and improvements.

Figure 2 is a sectional view of the assembled bearing on the line 2—2 of Figure 1, showing in diagram at the left of said figure, a retaining member thereof with its marginal flange unflexed.

Figure 3 is a detached view of a retainer for securing the anti-friction rollers in operative position in the assembled bearing, looking at the side thereof on which the marginal flange is formed and with said flange unflexed.

Figure 4 is a sectional view of said retainer on the line 4—4 of Figure 3; and

Figure 5 is a fragmentary detail view illustrating a modification.

Describing the invention with reference to the drawing, an anti-friction bearing embodying my invention and improvements, which for purposes of convenient reference is designated as a whole A, comprises inner and outer bearing members designated, respectively, $a$, $a'$, interposed between the bearing surfaces of which are cylindrical rollers 1, which form practically a continuous series extending entirely around the bearing with adjacent rollers free to contact with one another. As regards its usual features and excepting as hereinafter may particularly be described and pointed out, a bearing embodying my invention and improvements may be of any desired or approved construction, and can readily be understood and produced by mechanics familiar with such structures, from an examination of the drawing, in connection with the foregoing description, without a further description thereof in detail.

In accordance with the invention, the rollers 1 are confined in operative position between the bearing members $a$, $a'$, by what may be referred to as retainers, designated as a whole $b$, consisting, as shown, of rings 2 made of thin resilient sheet metal, the margins of which are outwardly dished or flared as shown, to form inclined marginal flanges 3, which are severed at intervals, as shown at 4, to form separate segments, which will be more readily flexible than would integral flanges. As applied in use, after the bearing has been assembled with the rollers 1 mounted between the opposed surfaces of the bearing members $a$, $a'$, the rings 2 are inserted into what may be designated annular grooves 5, formed by recessing both ends of the bearing members $a$, $a'$, as shown, with the outer edges of the marginal flanges 3 interlocked with interior shoulders 6 formed on the outer bearing member $a'$, and with the flat portions of said rings in contact with the shoulders formed on the outer bearing member by the inner ends of the annular grooves 5, and the inner edges thereof overlapping the corresponding shoulders on the inner bearing member with the least practicable clearance, thus effecting the objects of the invention as they relate to confining the inner bearing member and the anti-friction rollers in operative position in the bearing; excluding dust and dirt from the bearings; and retaining lubricant in the bearing.

As formed, initially, the diameter of the rings 2 at the edges of the marginal flanges 3 when unflexed, is slightly greater than the diameter of the shoulders 6 in opposite ends of the outer bearing member $a'$—as clearly shown in the diagrammatic view of one of said rings in Fig. 2—whereby said flanges will be under flexure when forced through the annular grooves 5 into engagement with the interior shoulders 6, thus insuring engagement of said marginal flanges with said shoulders under all operating conditions.

As a modification of the invention, I contemplate a construction in which the marginal flange 3 of the retainers b, instead of being cut out at spaced intervals, only, is cut away in a manner to form relatively narrow, circumferentially spaced, spring lugs which are flared at about the same angle as the flanges 3 in the preferred form of the retainer, and which in use, will operate in substantially the same way as said flanges to confine the rollers in position in the assembled bearings, but will require much less effort to effect engagement thereof with the shoulders 6 than is necessary with the preferred form of retainer heretofore described, while, at the same time, securing said retainers in position in the assembled bearing with an equally strong engagement.

This modification is shown in Fig. 6 of the drawing, in which 7 designates a single resilient, flared lug on the margin of the retainer, all other parts thereof being designated by the same reference characters as in the preferred form of the bearing.

I claim:

1. In a roller bearing, the combination of inner and outer bearing members provided with opposed, concentric bearing surfaces, both ends of said bearing members projecting beyond the bearing surfaces thereof and being correspondingly recessed to provide substantially similar shoulders thereon, respectively, at opposite ends of said bearing surfaces, a multiplicity of anti-friction rollers mounted between said bearing members, and retainer means for confining the inner bearing member and said anti-friction rollers in operative engagement with said bearing, consisting of rings made of thin, resilient sheet material, outwardly dished marginal flanges thereon arranged to interlock with interior shoulders formed adjacent the outer ends of the recessed portion of the outer bearing member; and the inner edges of the flat portions thereof overlapping the corresponding shoulders on the inner bearing member.

2. The combination specified in claim 1, in which the flat portions of the retainer rings also contact with the shoulders at the inner ends of the annular recesses in the outer bearing member.

3. The combination specified in claim 1, in which the dished marginal flanges of the retainers are severed at intervals to facilitate engagement of said retainers with the interior shoulders on the outer bearing member.

4. The combination specified in claim 1, in which outwardly flared resilient marginal lugs are formed on the retainers, arranged to interlock with the interior shoulders on the outer bearing member.

THOMAS L. ROBINSON.